US006339399B1

(12) United States Patent
Andersson et al.

(10) Patent No.: US 6,339,399 B1
(45) Date of Patent: Jan. 15, 2002

(54) ANTENNA ARRAY CALIBRATION

(75) Inventors: Sören Andersson, Stockholm; Ulf Forssén, Saltsjö-Boo; Fredrik Bengt Ovesjö , Solna; Sven Oscar Petersson, Sävedalen, all of (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/603,836

(22) Filed: Jun. 26, 2000

Related U.S. Application Data

(62) Division of application No. 08/844,638, filed on Apr. 21, 1997, now Pat. No. 6,157,343, which is a continuation-in-part of application No. 08/709,877, filed on Sep. 9, 1996, now abandoned, which is a continuation of application No. 08/253,295, filed on Jun. 3, 1994, now abandoned.

(51) Int. Cl.[7] ............................. H01Q 3/22; G01S 7/40
(52) U.S. Cl. ....................................... 342/372; 342/174
(58) Field of Search ................................ 342/372, 371, 342/174, 173

(56) References Cited

U.S. PATENT DOCUMENTS 4,532,518 A * 7/1985 Gaglione et al. ........... 342/372
4,673,939 A * 6/1987 Forrest ....................... 342/174
5,412,414 A * 5/1995 Ast et al. .................... 342/174

* cited by examiner

*Primary Examiner*—Gregory C. Issing
(74) *Attorney, Agent, or Firm*—Burns, Doane, Swecker & Mathis, L.L.P.

(57) ABSTRACT

A method and a system for calibrating the reception and transmission of an antenna array for use in a cellular communication system is disclosed. The calibration of the reception of the antenna array is performed by injecting a single calibration signal into each of a number of receiving antenna sections, in parallel. The signals are collected after having passed receiving components that might have distorted the phase and amplitude. Correction factors are generated and applied to received signals. The calibration of the transmission of the antenna array is preformed in a similar way. A single calibration signal is generated and injected into each of a number of transmitting antenna sections, one at a time. The signals are collected, one at a time, after having passed transmitting components that might have distorted the phase and amplitude. Correction factors are generated and applied to signals that are to be transmitted.

38 Claims, 7 Drawing Sheets

ANTENNA ARRAY CALIBRATION

FIELD OF THE INVENTION

This application is a divisional of application Ser. No. 08/844,638 now U.S. Pat. No. 6,157,343, filed Apr. 21, 1997.

This application is a continuation in part of U.S. Ser. No. 08/709,877 now abandoned filed Sep. 9, 1996 on of U.S. Ser. No. 08/253,295 now abandoned filed Jun. 3, 1994. The present invention relates to an antenna array for use in a base station in a cellular communication system. More particularly the present invention relates to a method and apparatus for calibrating an antenna array that receives and transmits communication signals without disturbing the normal traffic in the cellular communication system.

BACKGROUND OF THE INVENTION

The cellular industry has made phenomenal strides in commercial operations in the United States as well as the rest of the world. The number of cellular users in major metropolitan areas has -far exceeded expectations and is outstripping system capacity. Innovative solutions are thus required to meet these increasing capacity needs as well as to maintain high quality service and avoid raising prices. Furthermore, as the number of cellular users increases, the problems associated with cochannel interference become of increased importance.

FIG. 1 illustrates ten cells C1–C10 in a typical cellular mobile radio communication system. Normally, a cellular mobile radio system would be implemented with more than ten cells. However, for the purposes of simplicity, the present invention can be explained using the simplified representation illustrated in FIG. 1. For each cell, C1–C10, there is a base station B1–B10 with the same reference number as the corresponding cell. FIG. 1 illustrates the base stations as situated in the vicinity of the cell center and having omnidirectional antennas.

FIG. 1 also illustrates nine mobile stations M1–M9 which are movable within a cell and from one cell to another. In a typical cellular radio system, there would normally be more than nine cellular mobile stations. In fact, there are typically many times the number of mobile stations as there are base stations. However, for the purposes of explaining the present invention, the reduced number of mobile stations is sufficient.

Also illustrated in FIG. 1 is a mobile switching center MSC. The mobile switching center MSC illustrated in FIG. 1 is connected to all ten base stations B1–B10 by cables. The mobile switching center MSC is also connected by cables to a fixed switch telephone network or similar fixed network. All cables from the mobile switching center MSC to the base stations B1–B10 and cables to the fixed network are not illustrated.

In addition to the mobile switching center MSC illustrated, there may be additional mobile switching centers connected by cables to base stations other than those illustrated in FIG. 1. Instead of cables, other means, for example, fixed radio links may also be used to connect base stations to mobile switching centers. The mobile switching center MSC, the base stations and the mobile stations are all computer controlled.

In traditional cellular mobile radio systems, as illustrated in FIG. 1, each base station has an omnidirectional or directional antenna for broadcasting signals throughout the area covered by the base station. As a result, signals for particular mobile stations are broadcast throughout the entire coverage area regardless of the relative positions of the mobile stations using the system. In the base station, the transmitter has one power amplifier per carrier frequency. Amplified signals are combined and connected to a common antenna which has a wide azimuth beam. Due to the wide beam width of the common antenna, for example 120 or 360 degrees coverage in azimuth, the antenna gain is low and there is no spatial selectivity to use to reduce interference problems.

More recent techniques have focused on using linear power amplifiers to amplify a combined signal from several carrier frequencies which is then feed to a common antenna. In these systems, the common antenna also has a wide azimuth beam. As a result, these systems also suffer from interference problems.

To overcome these problems, antenna systems have been designed which increase the gain of the antenna while decreasing the interference problems associated with a typical base station. Narrow azimuth beams can be accomplished using an antenna array where each antenna section is connected to its own amplifiers. As a result, the gain of the individual beams can be higher than the typical wide beam used by a traditional antenna. Furthermore, polarization diversity can be used instead of spatial diversity to reduce fading variations and interference problems.

An antenna array is thus a group of similar antennas, or antenna sections, arranged in various configurations with proper amplitude and phase relations in order to give certain desired radiation characteristics. The direction and shape of the narrow antenna beam are determined by weighting each column signal with appropriate phase and amplitude factors. This can for instance be implemented as analog phase shifting, digital beamforming or with a beam forming matrix such as a Butler matrix, or a combination of these features.

There are receiving and transmitting antenna arrays comprising a number of receiving and transmitting antenna sections. The receiving and transmitting antenna sections comprises receiving and transmitting components that can distort the phase and the amplitude of signals. In order to more accurately shape and direct antenna beams and receive information about the exact position of the mobile phones, these transmitting and receiving array antennas need to be accurately calibrated, so that any distortion of phase and amplitude, or time delay, of signals are corrected before transmission and after reception of the signals.

There are several known inventions related to the calibration of antenna arrays. In U.S. Pat. No. 5,412,414 a self calibrating phased array radar is described. The operating part of the transmission and the reception may be calibrated by the addition of a corporate calibration network. The antenna array comprises several antenna sections, each comprising four radiating elements. Each antenna section has an in-built calibration function. The calibration function comprises an exciter which provides a signal for calibration and transmission, a receiver including a phase error sensing circuit referenced to the exciter and a measurement port, and a beamformer. The corporate calibration network has one output for every antenna section.

A disadvantage with this configuration is that each antenna section requires a calibration function of its own, resulting in a large amount of calibration circuits.

In GB-2 285 537 a method of calibrating the reception of an antenna array that receives communication signals is disclosed. Each receiving antenna section is selectively disconnected from the corresponding antenna and is instead connected to a respective tapping of a loop. An RF signal is fed through the loop in two different directions in turns. The resulting amplitude and phase of each receiving antenna section are detected in each case. The product of the signals that have traveled in different directions is constant and hence the phase and amplitude distortion in the calibration cable is corrected.

An disadvantage with this method is that the antennas have to be disconnected while calibrating the receivers resulting in interruption in the traffic.

In U.S. Pat. No. 5,248,982 a method and apparatus for calibrating the reception of phased array antennas that receives communication signals is disclosed, similar to the one previously described. Two orthogonal calibration signals are injected into the receiving antenna sections from opposite ends of a calibration cable to eliminate the effects of the calibration cable itself.

In EP 0 713 261 Al a phased array management system and calibration method are described. The phased array comprises transmitting and receiving phased array antennas that each includes a plurality of antenna sections. Each antenna section comprises a phase adjustment network and an amplitude adjustment network. A probe carrier signal is generated by a probe carrier source. By switching the probe carrier, in time sequence, between multiple antenna sections, the differential amplitude and phase characteristics of each of the antenna sections are determined. Corrective weighting coefficients are generated.

The calibration of an antenna array used in a cellular communication system should preferably be time efficient. Recurrent calibration while the system is running, essentially without disturbing the normal traffic in the communication system would be appreciable.

SUMMARY OF THE DISCLOSURE

The present invention deals with a problem with errors occurring in antenna arrays that might distort the phase and amplitude of received and transmitted signals. These errors affect the beam shape and the direction of the antenna beam.

Another problem dealt with by the present invention is how the calibration of an antenna array used in a cellular communication system can be accomplished in an easy and cost efficient way, essentially without disturbing the normal traffic in the communication system.

It is an object of the present invention to improve the performance of the radio communication system by increasing the accuracy of the beam shape and direction of the antenna beam.

It is another object of the present invention to correct errors in phase and amplitude introduced by receiving and transmitting components in antenna arrays.

It is yet another object of the present invention to correct for errors in phase and amplitude introduced by the means used for calibration.

It is another object of the present invention to calibrate an antenna array used in a cellular communication system essentially without disturbing the traffic in the communication system, in an easy and cost efficient way.

This is performed by measuring and correcting for errors and component behavior which occur in antenna array components and also for errors that are introduced by the calibration system used for calibration. As a result, the antenna array components do not need to be as accurately matched since any discrepancy can be corrected by using the present invention. Furthermore, the present invention can also be used to test the antenna array to verify that the components of the array are working properly before the antenna array is used by the communication system.

A calibration system for calibrating an antenna array that receives communication signals according to the present invention comprises a single calibration transmitter, a calibration network and a calibration controller.

A calibration system for calibrating an antenna array that transmits communication signals according to the invention comprises a single calibration receiver, a calibration network and a calibration controller.

According to one embodiment of the present invention, a method and apparatus for calibrating an antenna array that receives communication signals for use in a mobile radio communication system are disclosed. First, a calibration signal is generated by a calibration transmitter. This signal is divided into several equal signals and injected into each antenna section of the antenna array by a calibration network. The signals pass through receiving components in each antenna section that might distort the phase and amplitude of the calibration signal. The signals that have passed the receiving components in each antenna section are measured by a calibration controller and correction factors can then be formed for each antenna section.

According to one embodiment of the calibration of an antenna array that receives communication signals, one of the receiving antenna sections is selected as a reference section and a reference correction factor is generated for this section. Correction factors, relative the reference factor, are generated for the other antenna sections. The correction factors can adjust for phase and amplitude errors caused by the receiving components of each antenna section and for phase and amplitude errors caused by the used calibration network itself.

Each antenna section can then be adjusted using the correction factors so as to ensure that each antenna section is properly calibrated relative the other antenna sections. The calibration method is performed without essentially disturbing the normal traffic. The calibration signals can be injected and detected on traffic channels in use or between use at a limited time interval. The calibration signals an also be low-power spread spectrum signals injected into the normal traffic low.

According to another embodiment of the present invention, a method and apparatus for calibrating an antenna array that transmits communication signals for use in a mobile radio communication system are disclosed. Calibration signals are generated by a calibration controller and injected separately into each antenna section. The antenna sections comprise transmitting components that might distort the phase and the amplitude of the signals.

In one embodiment of the calibration of an antenna array that transmits communication signals a single calibration signal is generated by the calibration controller and injected into the different antenna sections separately in time. When the signal has passed the transmitting components in the respective antenna section it is collected by a calibration network and fed to a single calibration receiver. A correction factor is generated for each antenna section by the calibration controller, at different times. The antenna sections are then adjusted using the correction factors so as to ensure that each section is properly calibrated.

In another embodiment of the calibration of an antenna array that transmits communication signals a set of different orthogonal calibration signals is generated by the calibration controller and the calibration could then be performed simultaneously for all of the transmitting antenna sections. An advantage with the present invention is that the performance of a radio communication system is improved by increasing the accuracy of the beam shape and direction of the antenna beam.

Another advantage is that an antenna array in a cellular communication system is calibrated essentially without disturbing the traffic in the communication system, in an easy and cost efficient way.

BRIEF DESCRIPTION OF THE DRAWINGS

The present invention will now be described in more detail with reference to preferred embodiments of the invention, given only by way of example, and illustrated in the accompanying drawings, in which.

DETAILED DESCRIPTION OF THE DISCLOSURE

The present invention is primarily intended for use in base stations in cellular communication systems, although it will be understood by those skilled in the art that the present invention can also be used in other various communication applications.

An antenna array is typically a group of similar antennas, or antenna sections, arranged in various configurations with proper amplitude and phase relations in order to give certain desired radiation characteristics. An antenna section can comprise several radiating elements. Each antenna section comprises-means for receiving or for transmitting a radio signal. The antenna sections are connected to some beamforming device.

Figure 1:
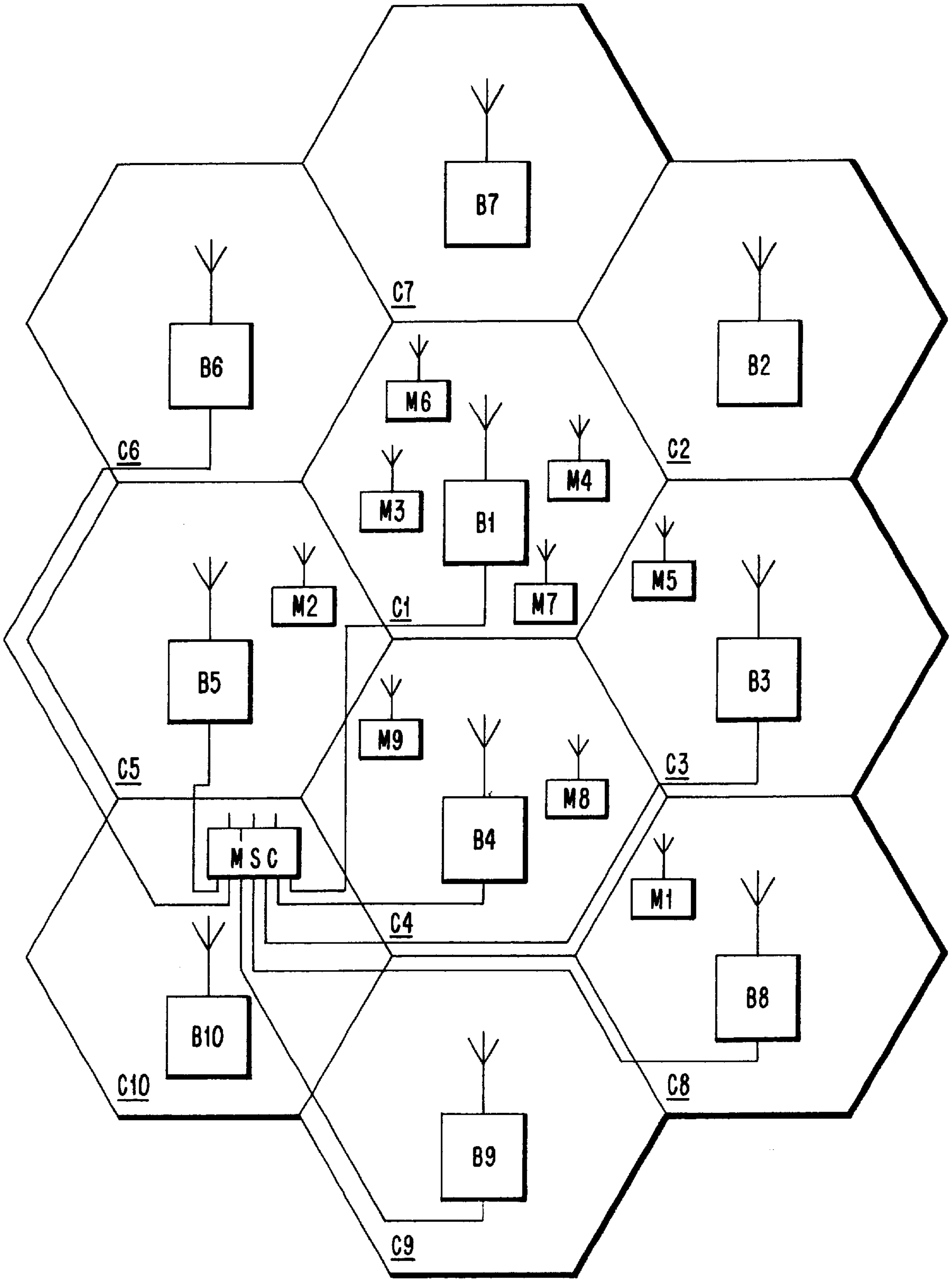
Fig. 1 PRIOR ART
FIG. 1 illustrates a typical prior art cellular radio communication system.
Figure 2:
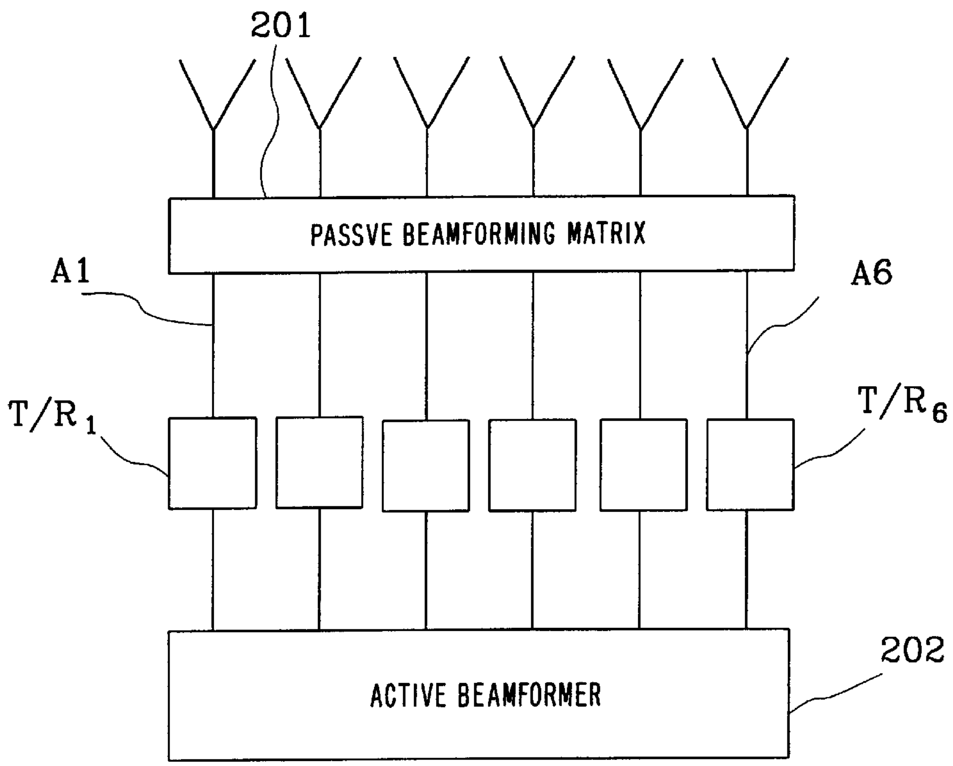
Fig.2 PRIOR ART
FIG. 2 illustrates a first configuration of a typical prior art antenna array.

The beamforming can take place in a single step or in two steps. If the beamforming is performed in two steps the antenna array comprises one passive beamforming matrix, for example a Butler matrix, that handles the radio frequency signal processing, and one active beamformer that handles the rest of the signal processing concerning the formation of the beam. Such a known antenna array configuration is shown in FIG. 2. The antenna array in the example shown in FIG. 2 comprises six antenna sections A1–A6, a passive beamforming matrix 201, transmitting or receiving components $T/R_1$–$T/R_6$, and an active beamformer 202. The passive beamforming matrix is not supposed to introduce any phase or amplitude errors. The signals are supposed to be distorted when passing the transmitting or receiving components.

Figure 3:
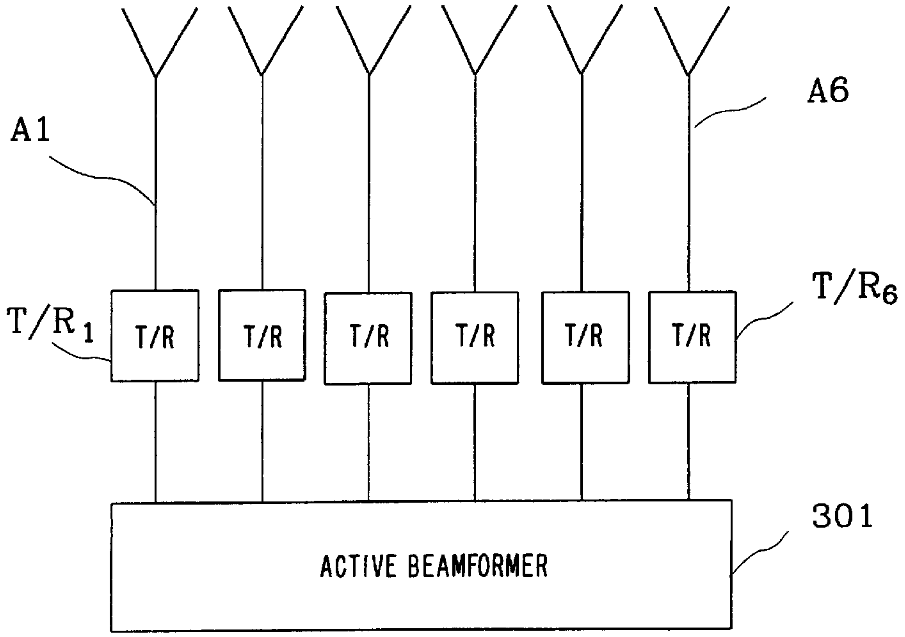
Fig.3 PRIOR ART
FIG. 3 illustrates a second configuration of a typical antenna array.

If the beamforming is performed in a single step all of the signal processing is handled by an active beamformer 301. Such a known antenna array configuration is shown in FIG. 3. The antenna array comprises six antenna sections A1–A6, transmitting or receiving components $T/R_1$–$T/R_6$, and an active beamformer 301.

According to the present invention, a calibration network is used to calibrate the components associated with each antenna section of an antenna array.

Figure 4:
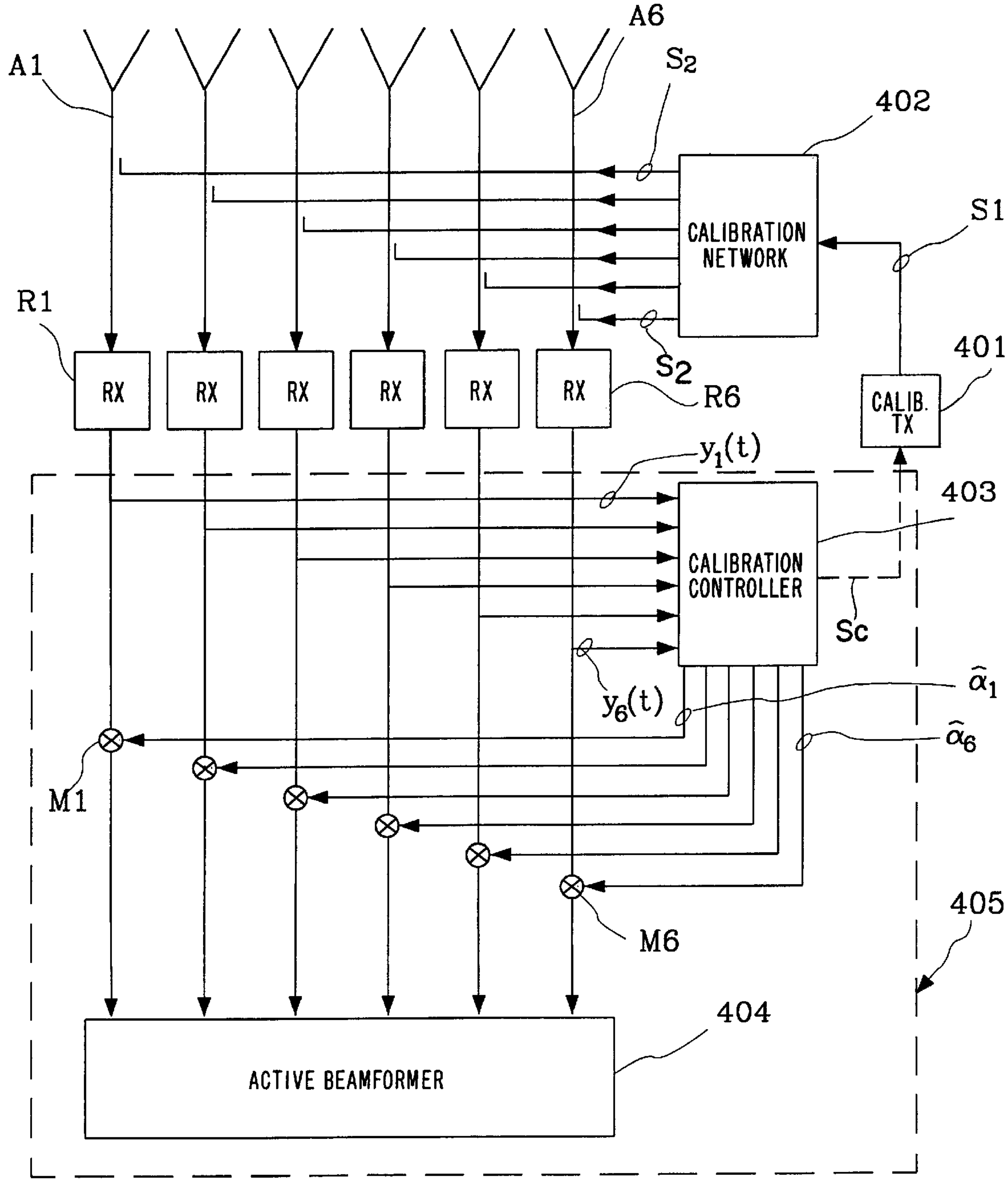
FIG. 4 illustrates a configuration for obtaining correction factors for an antenna array that receives communication signals according to one embodiment of the present invention.

FIG. 4 illustrates an apparatus for calibrating an antenna array that receives communication signals in a base station configuration. In the following description any time delay is considered to be small enough to be modeled as a phase shift. The calibration is performed by injecting a known calibration signal, such as a pure sinusoid, to each receiving antenna section. The output from each receiving antenna section is measured when the calibration signal has passed some receiving components.

As illustrated in FIG. 4, a calibration transmitter 401 generates a calibration signal S1, for example a pure sinusoid. The calibration transmitter 401 receives control signals Sc from a calibration controller 403 that give information about when the calibration signal S1 shall be transmitted. This is indicated in FIG. 4 by a dashed line from the calibration controller to the calibration transmitter.

In the example illustrated in FIG. 4 there are six receiving antenna sections A1–A6. The calibration signal Si is fed to a calibration network 402. The calibration network is a passive distribution network dividing the generated calibration signal S1 to a set of six equal signals S2, one signal for each receiving antenna section A1–A6 and these signals are applied to a calibration port at each receiving antenna section.

Each calibration signal S2 is then passed through receiving components R1–R6 in the respective receiving antenna sections comprising, for instance low noise amplifiers and A/Dconverters. These components might distort the phase and the amplitude of the injected signal. The resulting signals $y_1(t)$–$y_6(t)$, after passing the receiving components R1–R6 in each antenna section, are collected in parallel, that is preferably simultaneously, and sampled at certain sample instants t by the calibration controller 403.

The calibration controller 403 comprises computation means for generating correction factors $\alpha_1$–$\alpha_6$ for each receiving antenna section A1–A6 at certain times. The correction factors describe the amount of corrections needed as compensation in each antenna section. The correction factors can be described as amplitude and phase corrections or as corrections in in-phase and quadrature components, or shorter I- and Q-components. During active traffic the correction factors are applied to the traffic signals before the active beamforming.

The calibration controller 403 can be comprised in a beamforming device 405 as is shown in FIG. 4. This beamforming device is then thought of as a device that handles all signal processing including generating correction factors and adding the correction factors to the input signals before the actual beamforming. The actual beamformig is performed in an active beamformer 404.

As was previously mentioned the beamforming can take place in two steps and in such cases a passive beamforming matrix is comprised before the input signals pass through the receiving components. In one embodiment of the present invention the antenna array comprises a passive beamforming matrix. The calibration signal is then injected into each antenna section between the passive beamforming matrix and the receiving components. This is however not shown in FIG. 4.

The calibration network 402 itself might introduce phase and amplitude distortion of the calibration signals, for example due to different cable characteristics of the cables connected to different receiving antenna sections. This effect is only seen during calibration and could introduce phase and amplitude errors to the correction factors. These errors must be corrected before the correction factors are applied to the traffic signals during active traffic.

The impact on the phase and amplitude of signals sent through the calibration network is assumed to be constant during the life time of the antenna system and—hence temperature and time invariant. Therefore the phase and amplitude response of the calibration network can be measured initially and be compensated for.

When generating the correction factors the received signal from each of the receiving antenna sections could, according to one embodiment of the invention, be related to the original transmit signal for each antenna section. This implies that the information about the transmitted signal is buffered and available during the generation of correction factors.

When forming the antenna beams the most interesting information is the phase and amplitude relations between the different antenna sections and not the relations between the input and the collected signals. Another way of generating correction factors, according to a preferred embodiment of the invention, is therefore to choose one of the receiving antenna sections as reference and then generate correction factors relative to the reference section. The collected data can be modeled as complex samples and complex correction factors including corrections of phase and amplitude can be estimated, as will be described more in detail according to a method described below.

There are several methods for using the correction factors to adjust the phase and/or the amplitude of the input signals of the antenna array. The correction of the input signals can be modeled as multiplying the input signals with complex correction factors $\alpha_1$–$\alpha_6$ before the active beamforming is performed. The complex correction factors can correct for both phase and amplitude. This is indicated in FIG. 4 with the presence of one multiplier M1–M6 for each receiving antenna section. The beamformer 404 of the antenna array then form narrow antenna beams with preferably low side lobe levels.

Another way to illustrate the application of the correction factors is to apply the correction of amplitude to an amplifier to change the amplitude of the signal and/or to apply the correction in phase to a phase shifter for changing the phase of the signal.

Furthermore, the correction factors can be used by the beam forming device if digital beam forming is being used by adding the I- and Q-correction factors digitally.

Figure 5:
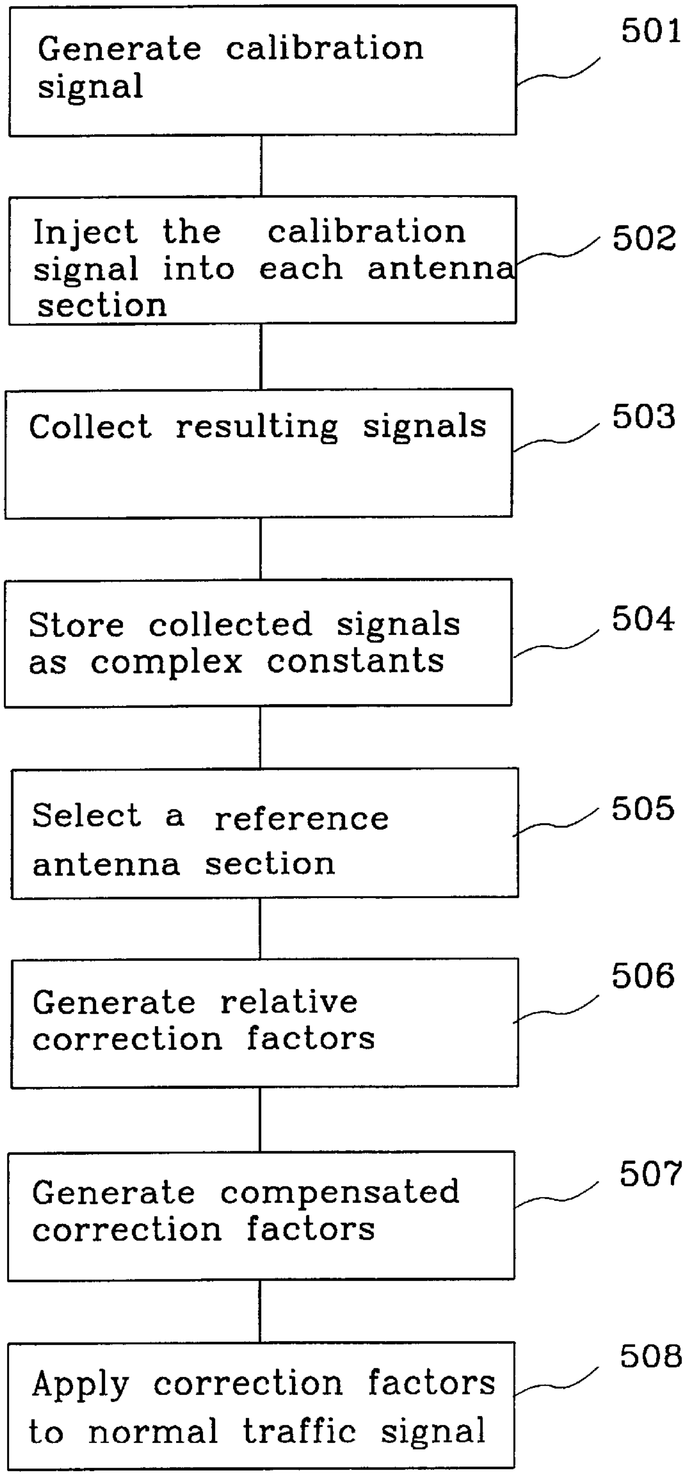
FIG. 5 illustrates a flow chart over a method for generating correction factors according to one embodiment of the present invention.

A method of generating correction factors for each of the receiving antenna sections is illustrated in a flow chart in FIG. 5. In the following description it is assumed that the antenna array comprises a number m of antenna sections. A calibration signal, for example a pure sinusoid, is generated 501. This signal is divided into a separate signal for each receiving antenna section. The divided signals are injected 502 into each receiving antenna section in parallel, that is preferably simultaneously. The signals pass through the respective receiving antenna section and the resulting signals are separately collected 503. Several samples for each antenna section are collected at different sample times t. The collected signals from the M different antenna sections at a time t are stored 504 as M complex samples in a complex data vector $y(t)\epsilon C^{M*1}$. The mth component of the complex data vector is denoted $y_m(t)$ and is modeled as a complex number representing an I- and Q-sample.

One of the receiving antenna sections is selected 505 as a reference section. The corresponding complex data element in the complex data vector is referred to as the reference data element. For simplicity the first data vector element $y_1(t)$ is selected as reference element in this example. Of course any other reference element could be chosen.

The other collected data elements are modeled as functions of the reference element:

$$y_m(t)=\beta_m\cdot y_1(t)+n_m(t)\ t=1, \ldots, N\ m=2, \ldots, M, \quad (5.1)$$

where N is the number of samples collected from each receiving antenna section, $n_m(t)$ is the measurement noise and $\beta_m$ is a complex constant that is the inverse of the correction factor $\alpha_m$.

The correction coefficient for the reference section is determined as for instance equaling 1. Through for example the least squares fitting method the relative correction factors are generated 506. There are other methods for computing the correction factors, well known to a person skilled in the art.

The least squares solutions for $\beta_m$, m=2, . . . , m are given by the expression:

$$\beta_m = \frac{1}{N}\sum_{t=1}^{N} y_1^H(t)y_m(t) \Big/ \sum_{t=1}^{N} y_1^H(t)y_1(t), \quad (5.2)$$

where $y_1^H(t)$ denotes the Hermitian transpose of the vector $y_1(t)$, as is well known by a person skilled in the art. N is the number of samples.

Letting the complex constant and hence the correction factor of the reference section equal one, $\beta_1 \equiv 1$, the relative correction factors are found to be $\alpha_{rel,m}=1/\beta_m$, m=1, . . . , M.

These relative correction factors are calculated with the assumption that the injected signals have the same phase and amplitude for all receiving antenna sections.

As was mentioned before the phase and amplitude of the injected signals will typically differ between different receiving antenna sections due to the phase and amplitude response of the calibration network. This phase and amplitude response is assumed to have been measured before setup.

The amplitude and phase responses of the connections from the calibration network to the respective receiving antenna section can be modeled as complex constants $\Psi_m \epsilon C$, m=1, . . . , M, where M is the number of receiving antenna sections. The phase response of the calibration network is measured relative the reference section. The effects introduced by the calibration network is compensated for through multiplying the relative correction factors with the factor $\Psi_m/\Psi_1$, thus forming 507 compensated correction factors:

$$\alpha_{comp,m}=\alpha_{rel,m}\cdot\Psi_m/\Psi_1\ m=1, \ldots M \quad (5.3)$$

These compensated correction factors are then applied 508 to the received traffic signal data during normal traffic in order to calibrate the receiving antenna sections relative to each other. This could be done by multiplying the received data in each antenna section with the respective correction factor, as was previously described.

It may be desirable to preserve some information about the signal power. For this purpose the amplitudes of the relative correction factors are renormalized thus generating 608 absolute correction factors. The power of the calibration signal from the calibration transmitter is supposed to have been measured at the manufacturing of the calibration transmitter. Therefore the power of the calibration signal $P_{in,1}$ injected into the reference antenna section is known. The received power from the reference section $\hat{P}_{out,1}$ is estimated and the absolute correction factors are calculated as:

$$\alpha_{abs,m}=\alpha_{comp,m}\cdot\sqrt{P_{in,1}/\hat{P}_{out,1}}\quad m=1, \ldots, M. \tag{5.4}$$

When absolute correction factors are calculated these factors are applied to the normal traffic signal data during normal traffic.

Figure 6:
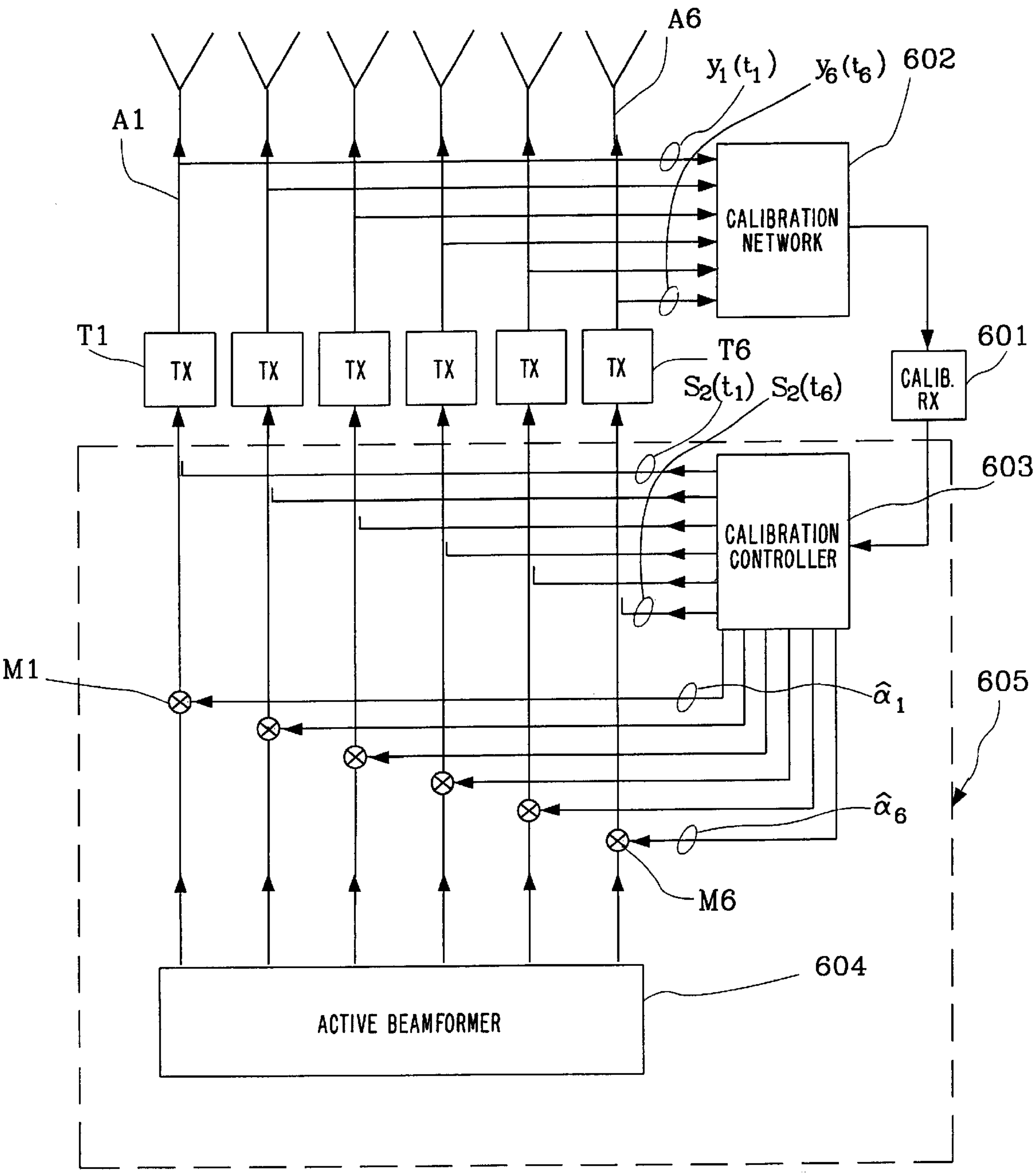
FIG. 6 illustrates a configuration for obtaining calibration factors an antenna array that transmits communication signals according to one embodiment of the present invention.

A configuration for calibrating an antenna array that transmits communication signals in a base station is illustrated in FIG. 6. In this configuration the antenna array comprises six transmitting antenna sections A1–A6. A calibration controller 601 generates a transmit calibration signal, for example a pure sinusoid, that is applied to each transmitting antenna section A1–A6 of the antenna array. The calibration signal passes through a respective transmitting antenna section comprising transmitting components T1–T6, such as power amplifiers and D/A-converters. These components might distort the phase and the amplitude of the injected signal.

When the calibration signals have passed through a respective transmitting antenna section the resulting signals $y_1(t_1)$–$y_6(t_6)$ from each transmitting antenna section are separately collected by a calibration network 602 and fed to a single calibration receiver 601. The calibration network is a passive network.

The calibration receiver is connected to a calibration controller 603. The calibration controller comprises computation means for generating correction factors $\alpha_1$–$\alpha_6$ for each transmitting antenna section in dependence of the signal received from the calibration receiver 601.

The calibration controller 603 can be comprised in a beamforming device 605 as is shown in FIG. 6. This beamforming device is then thought of as a device that handles all signal processing including generating correction factors and adding the correction factors to the input signals before the actual beamforming. The actual beamforming is performed in an active beamformer 604.

As was previously mentioned the beamforming can take place in two steps and in such cases a passive beamforming matrix is comprised before the input signals passes through the receiving components. In one embodiment of the present invention the antenna array comprises a passive beamforming matrix. The calibration signal is then collected from each antenna section between the transmitting components and the passive beamforming matrix. This is however not shown in FIG. 6.

The correction factors describe the amount of corrections needed as the compensations in each antenna section are calculated. The correction factors can be described as amplitude and phase corrections or corrections in in-phase and quadrature components, or shorter I- and Q-components.

When calibrating the antenna array that transmits communication signals according to the invention only one single calibration receiver is used. If the calibration network and the calibration receiver are not capable of separating the information from different transmitting antenna sections, each transmitting antenna section has to be separately calibrated one at a time.

In a first embodiment of the transmission calibration the same calibration signal is used for calibrating all transmitting antenna sections. This means that the calibration controller comprises only one signal generator. If all transmitting antenna sections were to send the same signal simultaneously the single calibration receiver would interpret the sampled data as one signal and therefore not be able to distinguish data from separate transmitting antenna sections. Hence each of the transmitting antenna sections has to be calibrated separately in time in this example.

The calibration signal S2($t_1$) is first injected into a first, reference, transmitting antenna section A1 at a first time $t_1$. The calibration network 602 samples this transmitting antenna section when the calibration signal has passed the transmitting components T1. The distorted signal y1($t_1$) is received at a first collection time by the calibration receiver 601.

Thereafter the same calibration signal S2($t_2$) is injected into a second transmitting antenna section at a second time $t_2$. The second transmitting antenna section A2 is sampled and the phase and amplitude distorted signal $y_2(t_2)$ is received by the calibration receiver (601). A compensated correction factor is generated by the calibration controller for the second transmitting antenna section relative the correction factor of the reference antenna section, according to the same method as was described in conjunction with steps 504–507 in FIG. 5.

The same calibration signal is injected into the rest of the antenna sections, one at a time, and correction factors are generated for each of the transmitting antenna sections.

When calibrating the antenna array the transmitting antenna sections preferably should be related to the limiting transmitting section, that is the antenna section that outputs the lowest power. The limiting transmitting antenna section is found by finding the compensated correction factor with the largest amplitude. According to one embodiment of the present invention limiting correction factors $\alpha_{lim,m}$ are calculated for each transmitting antenna section as:

$$\hat{a}_{\lim,m} = \frac{\hat{a}_{comp,m}}{\max\limits_{m}|\hat{a}_{comp,m}|}\quad m = 1, \ldots, M.$$

During normal operation of the antenna array the transmitted power can be controlled so that all power amplifiers are guaranteed to work within their dynamic range.

As the calibration of each transmitting antenna section is performed at different times the calibration is sensitive to time errors. If the time between the calibration signal is injected and sampled is not the same for all transmitting antenna sections, a time error will be introduced. This time error will be interpreted as a phase error when computing the correction factors. The phase error that is computed according to the method described in conjunction with FIG. 5 then includes the real phase error and a phase error caused by the time error.

Time errors can occur due to several reasons, depending on the hardware implementation. If, for example one transmitting antenna section delays the sending of a signal, a constant time error could be introduced. For such a time error one might want to adjust the time base in the transmitting antenna sections. For other situations it might suffice to eliminate the phase error caused by the time error from the estimated phase error.

To estimate time errors a special calibration signal could be chosen when calibrating the transmitting antenna sections, according to one embodiment of the present invention. This signal has a positive and negative phase slope during the data collection interval for each transmitting antenna section. One example of such a calibration signal is a signal with linear phase, with positive phase slope during a first time interval and then with the same phase slope but negative during a second consecutive time interval. This could be a signal that is composed of two sinusoids with different phase slopes $\alpha_+$ and $\alpha_-$ different time intervals, for example:

$$S_{cal} = \begin{cases} A\sin((f+\alpha_+)t), & t_0 < t < t_b \\ A\sin((f+\alpha_-)t), & t_b < t < t_e \end{cases}, \tag{7.1}$$

where $\alpha_+=\alpha_-$, $t_0$ is the start time of the calibration signal, $t_b$ is the breakpoint between the two phase slopes, $t_e$ is the endtime of the calibration signal, f is the carrier frequency and A is the amplitude.

Figure 7A:
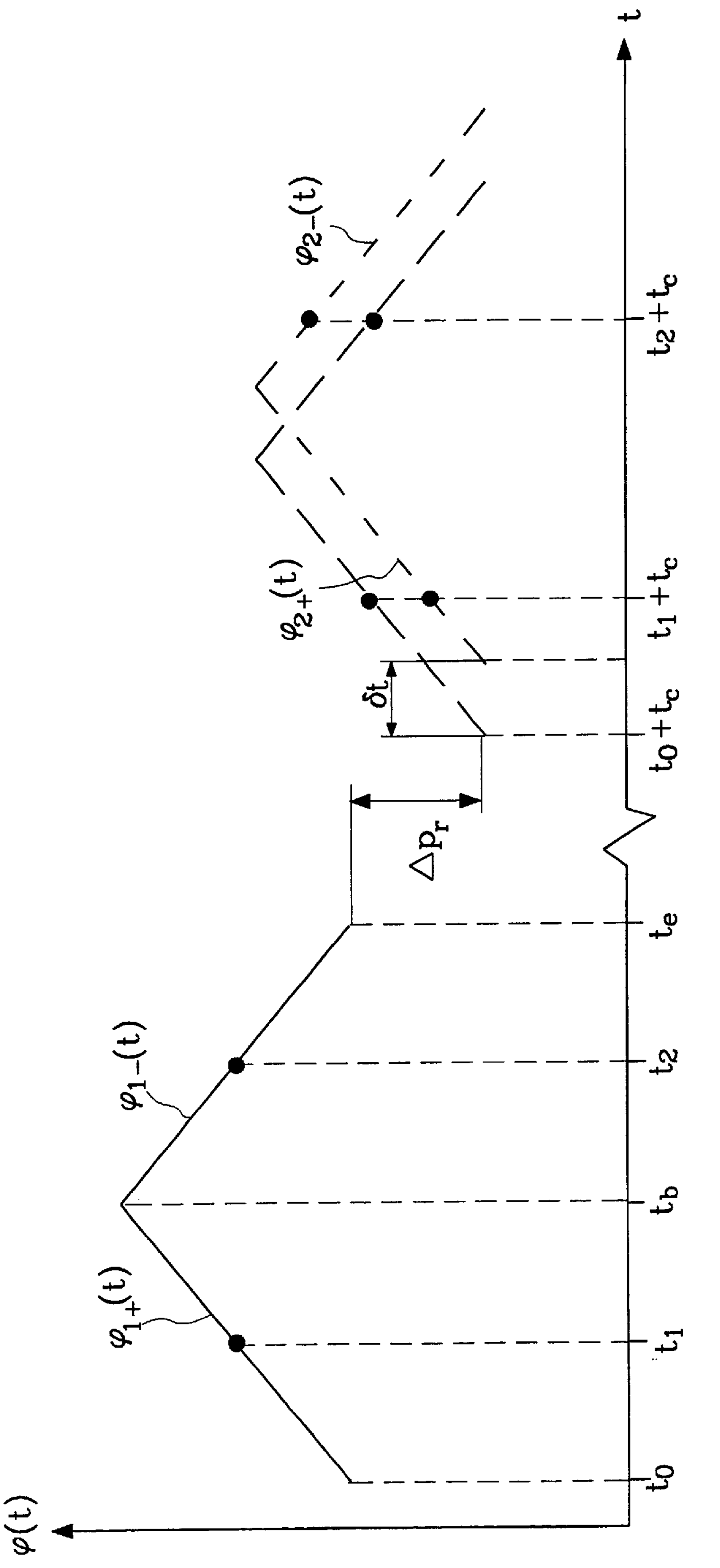
FIG. 7*a* illustrates a graph over the phase of a calibration signal according to the present invention, for two different transmitting antenna sections, as a function of time.

In FIG. 7*a* a graph of the phase of the calibration signal as function of time $\phi(t)$ is shown for two transmitting antenna sections. The phase function $\phi_1(t)$ of the calibration signal collected from the first (reference) transmitting antenna section has a positive slope $\alpha_{1+}$ during a first time interval $t_0<t<t_b$ and a negative phase $\alpha_{1-}$ slope during a second consecutive time interval $t_b<t<t_e$, according to the following function:

$$\varphi_1(t) = \begin{cases} \varphi_{1^+}(t), & t_0 < t < t_b \\ \varphi_{1^-}(t), & t_b < t < t_e \end{cases}, \tag{7.2}$$

where $$\phi_{1+}(t)=\alpha_+t+k_{11}, \tag{7.3}$$

and $$\phi_{1-}(t)=\alpha_-t+k_{12}, \tag{7.4}$$

where $k_{11}$ and $k_{12}$ are constants. The phase slopes have the same values with opposite signs:

$$\alpha_{1+}=-\alpha_{1-} \tag{7.5}$$

The first calibration signal is injected into the reference section at an initial time $t_0$ and a first sample is taken when the phase slope is positive, at a time $t_1$. A second sample is taken when the phase slope is negative at a time $t_2$. In reality several samples are collected for the positive and for the negative slope. For simplicity only one sample per slope is shown in the figure.

In this example the intended time between injection in two different transmitting antenna sections is a constant $t_c$. This could for instance be the time for a TDMA-frame if the antenna array is used in a TDMA-system. The first antenna section is then calibrated in a time slot in a first TDMA-frame and the next antenna section is calibrated in the same time slot in the following TDMA-frame.

The time between two consecutive corresponding injections of the calibration signal and samples should then also be tc. Hence at a time $t_0+t_c$ the same calibration signal as was injected into the first transmitting antenna section should be injected into the second transmitting antenna section. However, in this example there is a time delay of $\delta t$ in the second transmitting antenna section and the second signal is instead injected at a time $t_0+t_c+\delta t$.

The phase function $\delta\mathbf{2}(t)$ of the second injected signal has the same positive $\alpha_+$ and negative $\alpha_-$ a slope as the first injected signal in the reference section, but has a phase shift $\Delta p_r$ in comparison to the phase response of the reference section. This is denoted as the real phase error. The part of the second phase function that has a positive slope is denoted $\phi_2+(t)$ and the part with negative phase slope is denoted $\phi_{2-}(t)$ in FIG. 7*a*.

A first sample of the second injected signal is taken at a time $t_1+t_c$ and a second sample is taken at a time $t_2+t_c$, as is indicated in FIG. 7*a*. In reality several samples are collected for the positive and for the negative slope. For simplicity only one sample per slope is shown in the figure.

The dashed line in FIG. 7*a* illustrates the ideal situation when no time error $\delta t$ exists between the transmitting antenna sections.

Figure 7B:
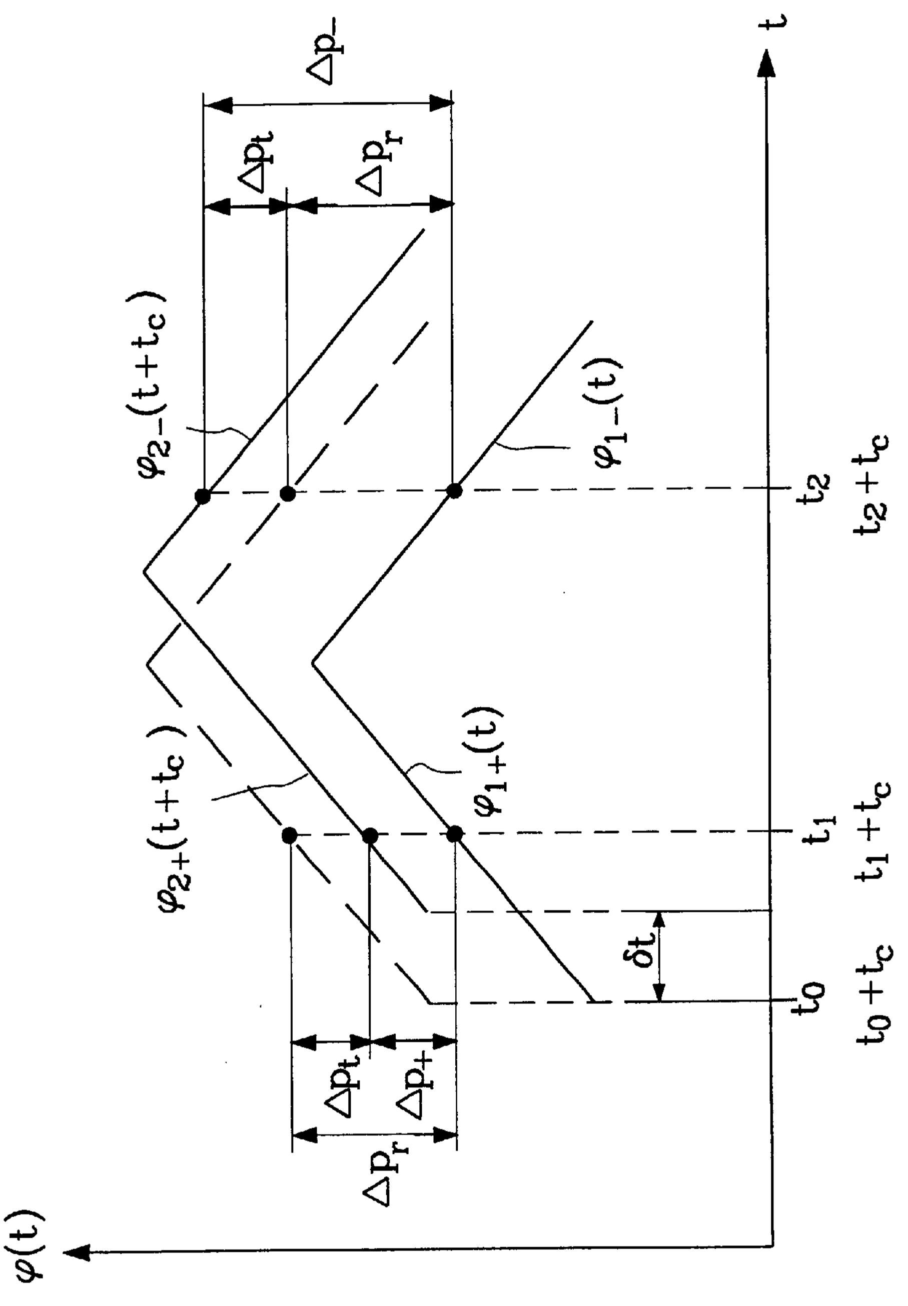
FIG. 7*b* illustrates a graph over the phase of the calibration signal according to the present invention, for two different transmitting antenna sections, as a function of time.

In FIG. 7*b* the same situation as was shown in FIG. 7*a* is illustrated. However in this figure the second phase function $\phi_2(t)$ is transposed in time a factor $t_c$, which is the expected time difference, and is shown as $\phi_2(t+t_c)$. Therefore the injection times for the first calibration signal $t_0$ and the second calibration signal $t_0+t_c$ are shown at the same position on the time axis.

A relative, compensated phase error relating the phase error of the second antenna section to the reference antenna section can be generated according to the method described in conjunction with FIG. 5. The phase error that will be found when estimating the phase error from the sample for the positive phase slope is denoted $\Delta p_+$. The phase error that will be found when estimating the phase error from the sample for the negative phase slope is denoted $\Delta p_-$. This estimated phase error will include the real phase error $\Delta p_r$ as well as the phase error Apt introduced by the time error $\delta t$.

From FIG. 7*b* the following equations can be derived:

$$\Delta P_+=\Delta p_r-\Delta p_t \tag{7.6}$$

$$\Delta p_-=\Delta p_r+\Delta p_t \tag{7.7}$$

If these equations are combined the real phase error and the phase error introduced by the time error are found to be:

$$\Delta p_r=(\Delta p_++\Delta p_-)/2 \tag{7.8}$$

$$\Delta p_t=(\Delta p_--\Delta p_+)/2 \tag{7.9}$$

The time error $\delta t$ can be estimated when expressing the phase error caused by the time error as:

$$\Delta p_t=\alpha_+ {}^*\delta t \tag{7.10}$$

The combination of equations 7.9 and 7.10 gives the time error:

$$\delta t=(\Delta p_--\Delta p_+)/(2\alpha_+ \tag{7.11}$$

The real phase error will be used in the correction factor. If it is desirable to eliminate the time error during normal operation the time base in the transmitting antenna sections can be corrected with the time error $\delta t$. The phase slope of the traffic signals may differ from the phase slope of the calibration signal. By using the formula (7.11) the time error can be calculated for every phase slope.

In a second embodiment of the calibration of the transmitters the transmitting antenna sections are capable of simultaneously transmitting different calibration signals and still perform a separate calibration for each of the transmitting antenna sections. The calibration controller then generates different simultaneous signals that are mutually orthogonal. Examples of orthogonal signals are signals of different frequencies or signals modulated with orthogonal codes, for example Walsh-Hadamard codes or orthogonal Gold codes.

This implies that the calibration controller comprises one signal generator for each of the transmitting antenna sections. This solution is therefore more hardware demanding. On the other hand it is less time consuming.

The orthogonal signals are simultaneously injected into a respective transmitting antenna section. The resulting signals are then passed through the calibration network and received by the single calibration receiver in parallel, that is simultaneously, after having passed through the phase and amplitude distorting components of the transmitting antenna sections.

The collected signals are superimposed in the calibration network and received in the calibration receiver as one composite signal. Since the signal components are orthogonal, the calibration controller can separate the individual signals and compute correction coefficients of phase and amplitude.

When generating the correction factors in this case the received signals from the calibration receiver have to be related to the original transmitted signals for each antenna section. This implies that the injection of a calibration signal and the sampling of the corresponding signal are synchronized. The information about the transmitted signal must be buffered and available during the generation of correction factors.

The calibration of the antenna array according to this invention is intended to be performed during normal traffic, such that the traffic is not affected or very little affected by the calibration.

The correction factors are frequency dependent. This means that correction factors for different frequencies must be generated. However, for frequencies within the same coherency bandwidth it suffices to compute one set of correction coefficients for one frequency within that band. The frequency spectrum is therefore divided into a number of frequency bands, each band narrower than the coherency bandwidth. Each band is then calibrated separately.

The calibration could be performed on-ine without disturbing the normal traffic flow in one of the following ways:

a) by using, or "stealing", a short limited period of time from normal traffic channels. In this case a short period of time is stolen from a normal traffic channel and the traffic on that channel will be disturbed for a short while. However that might have minor effect on for example speech quality;

b) by using a limited amount of time between the termination of one call using one channel and the setup of the next call on the same channel. In this case normal traffic is not disturbed but a new call could be delayed for a very short period of time;

c) by injecting a low power, spread spectrum signal into the normal traffic flow and collecting the signal in a correlation receiver. In this case the traffic flow is non interrupted. The calibration controller then comprises a correlation receiver. The duration of the spread spectrum signal is chosen so that the processing gain can suppress the normal traffic signal in the correlation receiver enough to facilitate accurate estimation of the calibration factor. The spread spectrum signal might introduce some interference to the traffic channels but the power is chosen low to limit the interference.

The method for calibration of the transmitting and receiving antenna sections of an antenna array according to the present invention could be continuously performed in the system or at specific time intervals.

The implementation of the on-line calibration is different for TDMA-, CDMA- and FDMA-system due to the fact that the channel concept differs in these systems.

In a TDMA-system a channel is defined by a time slot and a frequency. In a first embodiment of the calibration of a TDMA-system, according to option a), the calibration of the antenna array is performed by stealing time slots from traffic channels. Instead of handling the normal traffic signals the calibration signal is then injected and correction factors computed.

In another embodiment of the calibration of an antenna array in a TDMA-system, according to option b), free time slots dedicated to traffic channels are used for calibration. This could be the time between one call terminates and the next is set up on the same slot. Calibration could then be made every time a call has terminated, which should be sufficiently often to ensure that the correction factors are reliable.

In a frequency hopping TDMA-system all frequencies could be calibrated in one sweep. This means that samples could be collected for each frequency in a hop sequence while stepping through the sequence. Data is thus collected for each frequency and calibration factors are estimated according to the method previously described.

In a third embodiment of the calibration of an antenna array in a TDMA-system, according to option c), the calibration signal is a low-power spread spectrum signal that is injected into the normal signal flow. This signal is collected and fed to a correlation receiver comprised in the calibration controller.

In a CDMA-system a channel is defined by a special code. In a first embodiment of the calibration of an antenna array in a CDMA-system, according to option a), a code that is already in use for a traffic channel is stolen for a short period of time and the calibration is performed.

In another embodiment of the calibration of an antenna array in a CDMA-system, according to option b), a free code is used for calibration, for example between the termination of a call using a certain code and the set up of a new call using the same code.

In yet another embodiment of the calibration of an antenna array in a CDMA-system, according to option c), a low-power spread spectrum signal is injected into the normal traffic flow. This signal will have a code of its own and it will typically have lower power than the normal traffic signals. Data is collected over a longer period of time than what is needed if a normal traffic code is used.

In a CDMA-system the number of possible codes are often more than the number of possible users, only a part of the possible codes are thus used in a CDMA-system. In a fully loaded system, that is when the maximum number of users are assigned to the system without exceeding the allowed interference level, there is always a possibility of overloading the system by using an unused code. This will however lead to increasing interference in the system. According to one embodiment of the present invention a normal traffic code that is not to be used in the system is used for calibration.

In a FDMA-system a channel is defined by a certain frequency. In a first embodiment of the calibration of an antenna array in a FDMA-system, according to option a), a short period of time is stolen from a traffic channel, for example from a frequency that is in use, and the calibration is performed.

In a second embodiment of the calibration of an antenna array in a FDMA-system, according to option b), free frequencies are used for a short period of time, for example the time between the termination of a call on a certain frequency and the set up of another call using that frequency.

In a third embodiment of the calibration of an antenna array in a FDMA-system, according to option c), a low-power spread spectrum signal is superimposed on top of a specific carrier.

The present invention severely reduces the accuracies required of the components connected to each antenna section because the present invention measures and corrects for errors generated by these components. In addition, the system used for calibration simultaneously tests the devices associated with each antenna section so as to verify that the antenna array is working properly.

The invention provides a method and apparatus for calibrating the antenna sections of an antenna array comprised in a base station. The calibration can be performed essentially without interrupting or disturbing the normal traffic flow in the radio communication system. The calibration apparatus according to the invention only comprises one single calibration transmitter and one single calibration receiver, used to calibrate the whole receiving and transmitting antenna array.

It will be appreciated by those of ordinary skill in the art that the present invention can be embodied in other specific forms without departing from the spirit or central character thereof. The presently disclosed embodiments are therefore considered in all respects to be illustrative and not restrictive. The scope of the invention is indicated by the appended claims rather than the foregoing description, and all changes which come within the meaning and range of equivalence thereof are intended to be embraced therein.

We claim:

1. A method for calibrating an antenna array that transmits communication traffic signals during beamforming in a mobile radio communication system, said antenna array comprising a number of transmitting antenna sections each comprising transmitting components that might distort the phase and the amplitude of signals that are to be transmitted, said method comprising the steps of:

a) generating a single calibration signal;

b) injecting said calibration signal into each transmitting antenna section, one at a time;

c) collecting a resulting calibration signal from each transmitting antenna section after having passed the transmitting components in each transmitting antenna section, one at a time;

d) generating correction factors for each transmitting antenna section; and e) adjusting said transmitting antenna sections with said correction factors, wherein said steps are performed during a limited amount of time on a traffic channel in use.

2. A method for calibrating an antenna array according to claim 1, where in said generation of correction factors comprises:

a) selecting one of the transmitting antenna sections as a reference section;

b) determining a correction factor for the reference section; and c) generating correction factors for the rest of the transmitting antenna sections, one at a time, relative the correction factor of the reference section.

3. A method for calibrating an antenna array according to claim 1, wherein said calibration signal has a positive phase slope during a first time interval and a negative phase slope during a second consecutive time interval, and wherein the calibration signal is sampled in the first and the second time interval, and wherein samples from the first time interval are compared with samples from the second time interval, in order to estimate a time error.

4. A method for calibrating an antenna array according to claim 1, wherein said calibration signal is a pure sinusoid.

5. A method for calibrating an antenna array according to claim 1, wherein said generation of correction factors for each transmitting antenna section comprises the steps of:

a) modeling the received signals as complex data samples; and b) generating said correction factors as complex factors.

6. A method for calibrating an antenna array according to claim 1, wherein said correction factors compensate for signal errors introduced by the transmitting components in each transmitting antenna section, and for signal errors introduced by means used for calibrating the antenna array.

7. A method for calibrating an antenna array according to claim 1, wherein said correction factors are limiting the signal power of transmitted signals.

8. A method for calibrating an antenna array according to claim 1, wherein said correction factors adjust the phase of the signals that are to be transmitted by the antenna sections.

9. A method for calibrating an antenna array according to claim 1, wherein said correction factors adjust the amplitude of signals that are to be transmitted by the antenna sections.

10. A method for calibrating an antenna array according to claim 1, wherein said correction factors adjust the phase and amplitude of signals that are to be transmitted by the antenna sections.

11. A method for calibrating an antenna array according to claim 1, wherein the correction factors are applied to signals that are to be transmitted, after active beamforming.

12. A method for calibrating an antenna array according to claim 1, wherein the calibration signal is a lower-power spread spectrum signal that is injected into the normal traffic flow.

13. A method for calibrating an antenna array according to claim 1, wherein the radio communication system is a CDMA-system with a predetermined number of codes that are allowed for use during normal traffic, wherein a code that is not intended to be used for traffic is used for calibration.

14. A method for calibrating an antenna array according to claim 1, wherein said method is continuously repeated.

15. A method for calibrating an antenna array according to claim 1, wherein said method is repeated at certain time intervals.

16. A method for calibrating an antenna array that transmits communication traffic signals during beamforming in a mobile radio communication system, said antenna array comprising a plurality of transmitting antenna sections each comprising transmitting components that might distort the phase and the amplitude of signals that are to be transmitted, said method comprising the steps of:

a) generating a set of orthogonal calibration signals;

b) injecting said calibration signal into the respective transmitting antenna sections, in parallel;

c) collecting a respective resulting calibration signal from each transmitting antenna section after having passed the transmitting components in the respective transmitting antenna sections;

d) generating correction factors for each transmitting antenna section; and e) adjusting said transmitting antenna sections with said correction factors, wherein said steps are performed during a limited amount of time on a traffic channel in use.

17. A method for calibrating an antenna array according to claim 16, wherein the calibration signals are of different frequencies.

18. A method for calibrating an antenna array according to claim 16, wherein the calibration signals are different orthogonal codes.

19. A method for calibrating an antenna array according to claim 16, wherein said calibration signal is a pure sinusoid.

20. A method for calibrating an antenna array according to claim 16, wherein said generation of correction factors for each transmitting antenna section comprises the steps of:

a) modeling the received signals as complex data samples; and b) generating said correction factors as complex factors.

21. A method for calibrating an antenna array according to claim 16, wherein said correction factors compensate for signal errors introduced by the transmitting components in each transmitting antenna section, and for signal errors introduced by means used for calibrating the transmission of the antenna array.

22. A method for calibrating an antenna array according to claim 16, wherein said correction factors are limiting the signal power of transmitted signals.

23. A method for calibrating an antenna array according to claim 16, wherein said correction factors adjust the phase of the signals that are to be transmitted by the antenna sections.

24. A method for calibrating an antenna array according to claim 16, wherein said correction factors adjust the amplitude of signals that are to be transmitted by the antenna sections.

25. A method for calibrating an antenna array according to claim 16, wherein said correction factors adjust the phase and amplitude of signals that are to be transmitted by the antenna sections.

26. A method for calibrating an antenna array according to claim 16, wherein the correction factors are applied to signals that are to be transmitted, after active beamforming.

27. A method for calibrating an antenna array according to claim 16, wherein the calibration signal is a low-power spread spectrum signal that is injected into the normal traffic flow.

28. A method for calibrating an antenna array according to claim 16, wherein the radio communication system is a CDMA-system with a predetermined number of codes that are allowed for use during normal traffic, wherein a code that is not intended to be used for traffic is used for calibration.

29. A system for calibrating an antenna array that transmits communication traffic signals during beamforming in a mobile radio communication system, said antenna array comprising a number of transmitting antenna sections each comprising transmitting components that might distort the phase and the amplitude of signals that are to be transmitted, said system comprising:

means for generating a single calibration signal;

means for injecting said calibration signal into each transmitting antenna section, one at a time;

means for collecting a resulting calibration signal from each transmitting antenna section after having passed the transmitting components in each transmitting antenna section, one at a time;

means for generating correction factors for each transmitting antenna section; and means for adjusting said transmitting antenna sections with said correction factors, wherein said method for calibrating is performed during a limited amount of time on a traffic channel in use.

30. A system for calibrating an antenna array according to claim 29, wherein said correction factors adjust the phase of signals that are to be transmitted by the antenna sections.

31. A system for calibrating an antenna array according to claim 29, wherein said correction factors adjust the amplitude of signals that are to be transmitted by the antenna sections.

32. A system for calibrating an antenna array according to claim 29, wherein said correction factors adjust the phase and amplitude of signals that are to be transmitted by the antenna sections.

33. A system for calibrating an antenna array according to claim 29, wherein the correction factors are applied to signals that are to be transmitted, after active beamforming.

34. A system for calibrating an antenna array that transmits communication traffic signals during beamforming in a mobile radio communication system, said antenna array comprising a plurality of transmitting antenna sections each comprising transmitting components that might distort the phase and the amplitude of signals that are to be transmitted, said system comprising:

means for generating a set of orthogonal calibration signals;

means for injecting said calibration signal into the respective transmitting antenna sections, in parallel;

means for collecting a respective resulting calibration signal from each transmitting antenna section after having passed the transmitting components in the respective transmitting antenna sections;

means for generating correction factors for each transmitting antenna section; and means for adjusting said transmitting antenna sections with said correction factors, wherein said system for calibrating is performed during a limited amount of time on a traffic channel in use.

35. A system for calibrating the transmission of an antenna array according to claim 34, wherein said correction factors adjust the phase of signals that are to be transmitted by the antenna sections.

36. A system for calibrating the transmission of an antenna array according to claim 34, wherein said correction factors adjust the amplitude of signals that are to be transmitted by the antenna sections.

37. A system for calibrating the transmission of an antenna array according to claim 34, wherein said correction factors adjust the phase and amplitude of signals that are to be transmitted by the antenna sections.

38. A system for calibrating the transmission of an antenna array according to claim 34, wherein the correction factors are applied to signals that are to be transmitted, after active beamforming.

* * * * *